United States Patent
Christuk et al.

(10) Patent No.: US 6,468,380 B1
(45) Date of Patent: Oct. 22, 2002

(54) SOLUTION COATED MICROEMBOSSED IMAGES

(75) Inventors: Christopher C. Christuk, Newbury, MA (US); Nikos J. Georgakakis, Revere, MA (US); Robert J. Balaam, Amesbury, MA (US)

(73) Assignee: Foilmark, Inc., Newburyport, MA (US)

( * ) Notice: Subject to any disclaimer, the term of this patent is extended or adjusted under 35 U.S.C. 154(b) by 0 days.

(21) Appl. No.: 09/514,534

(22) Filed: Feb. 28, 2000

(51) Int. Cl.$^7$ .............. B29C 47/00; G02B 5/30; C23C 16/00
(52) U.S. Cl. .......... 156/244.16; 156/277; 264/1.31; 427/162; 427/255.19; 427/255.32; 427/255.36; 427/419.2; 430/2
(58) Field of Search .................. 428/203, 204, 428/212, 702, 704, 694 DE; 427/162, 164, 249.5, 255.19, 255.32, 255.36, 255.38, 255.37, 393, 419.2; 264/1.9, 1.31, 1.7; 430/1, 5, 2; 156/60, 209, 244.15, 244.16, 277, 289

(56) References Cited

U.S. PATENT DOCUMENTS

| | | | |
|---|---|---|---|
| 3,703,407 A | 11/1972 | Hannan et al. | |
| 4,259,285 A | 3/1981 | Baumgartl et al. | |
| 4,856,857 A * | 8/1989 | Takeuchi et al. | 283/72 |
| 4,945,215 A | 7/1990 | Fukushima et al. | |
| 5,009,933 A * | 4/1991 | Matsuda et al. | 427/287 |
| 5,087,510 A | 2/1992 | Tokas et al. | |
| 5,164,227 A | 11/1992 | Miekka et al. | |
| 5,351,142 A * | 9/1994 | Cueli | 359/2 |
| 5,464,710 A * | 11/1995 | Yang | 430/1 |
| 5,503,792 A | 4/1996 | Kawamura et al. | |
| 5,503,896 A | 4/1996 | Veith et al. | |
| 5,781,316 A | 7/1998 | Strahl et al. | |
| 5,947,369 A * | 9/1999 | Frommer et al. | 233/382 |
| 5,948,199 A | 9/1999 | McGrew | |

* cited by examiner

Primary Examiner—Donald J. Loney
(74) Attorney, Agent, or Firm—Kenyon & Kenyon

(57) ABSTRACT

The present invention is directed to transparent articles including a microembossed image such as a hologram or diffraction grating, coated at least in-part, with a layer of material having a refractive index that differs from the refractive index of the transparent layer by about 0.2 units and can be prepared by solution coating techniques such as conventional printing, e.g., rotogravure.

18 Claims, 2 Drawing Sheets

SOLUTION COATED MICROEMBOSSED IMAGES

FIELD OF THE INVENTION

This invention relates to the field of holographic articles including microembossed images, such as holograms or diffraction gratings, and, more particularly, to transparent holographic materials and processes for their preparation.

BACKGROUND OF THE INVENTION

Microembossed holographic and diffraction grating articles or constructions are well known. Typical forms include hot stamping foils, overlays, labels, packaging, stickers and the like. Such articles each contain a layer which can be impressed with a microembossed image. U.S. Pat. Nos. 4,259,285; 5,503,792; 5,164,227 and 5,503,896 describe different methods for microembossing a variety of materials.

For some applications the microembossed layer is subsequently coated with an opaque, reflective layer such as aluminum so that a vivid, intense image is readily visible. Examples of reflective holographic articles are described in U.S. Pat. Nos. 4,945,215 and 5,087,510.

For other applications it is advantageous for the microembossed article to be transparent so that graphics or text may be viewed through the image. To accomplish this effect, it is necessary to apply a further layer that has a refractive index that differs from the refractive index of the microembossed layer by about 0.2 or more. Typically the further layer has a higher refractive index than the microembossed layer and is referred to herein as a HRI coating or layer. Examples of this approach are described in U.S. Pat. Nos. 3,703,407; 4,856,857; 5,351,142; 5,781,316 and 5,948,199. If the further layer has a lower refractive index than the microembossed layer it is referred to herein as a LRI coating or layer.

The HRI or LRI coatings or layers are deposited from the vapor phase to avoid damage to the microembossed layer. Conventional deposition techniques include reactive or non-reactive vacuum vapor deposition, sputtering, electron beam deposition, ion beam assisted deposition and the like. These techniques start with the HRI or LRI material or reactive precursor thereto in solid form, and transfer the HRI or LRI material, in vacuuo, onto the microembossed layer (e.g., see; U.S. Pat. No. 5,464,710). Such techniques are slow and expensive and require bulky, costly equipment that may have no other use.

OBJECTS AND SUMMARY OF THE INVENTION

Accordingly, objects of this invention include providing: 1) solution-borne, HRI or LRI materials which can be used to create transparent holographic articles; 2) preparing transparent holographic articles by means of a process that includes a solution coating step, e.g., traditional printing methods; 3) efficiently preparing low cost transparent holographic articles such as hot stamping foils, overlays, films, labels and 4) other objects and advantages that will be apparent to those skilled in the art.

In one aspect this invention comprises, transparent articles including a microembossed image formed by a process that includes a step of applying solution-borne high or low refractive index material to a microembossed surface using solution or liquid coating method, e.g., a printing technique such as flexography, gravure, offset, intaglio or litho.

In another aspect this invention comprises, liquid-borne HRI or LRI materials which are formulated for application to a microembossed image, e.g., an ink suitable for a conventional printing process.

In yet another aspect this invention comprises, the articles prepared in accordance with the above-described method, which include transparent holographic transfer products such as a hot stamping foil or a security overlay, a transparent holographic adhesive label, a transparent holographic film and the like.

Other advantageous features and objects will become apparent upon reference to the following description of the preferred embodiments when read in light of the attached drawings.

DETAILED DESCRIPTION OF THE INVENTION

Figure 1:
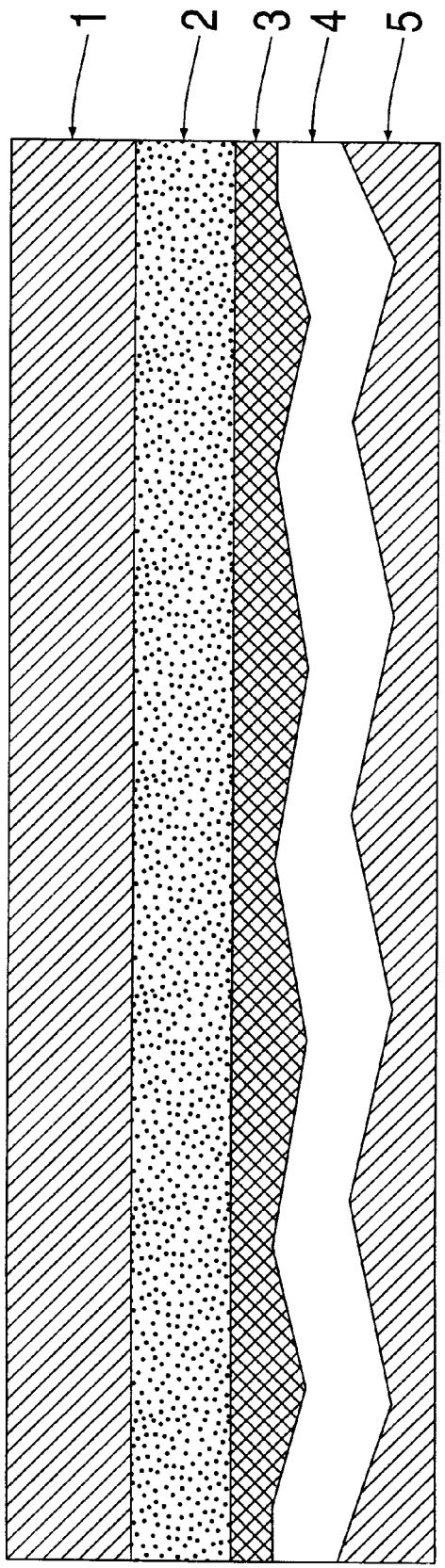
FIG. 1 is a cross-sectional diagram of a transparent holographic hot stamping foil prepared in accordance with the present invention.

The HRI or LRI coating materials disclosed herein may comprise any liquid form of an HRI or LRI material having a viscosity, drying, flow and other properties and characteristics, suitable for the selected application technique, e.g., a suspension of a HRI or LRI material, a HRI or LRI material dispersed in a binder, a combination of the two, or similar liquid-borne embodiments. For example, the HRI coating disclosed herein may comprise a suspension of a HRI material, or a HRI material dispersed in a binder or combination of the two, or similar liquid-borne embodiment. These HRI and LRI compositions are used to safely deposit a coating that forms a uniform layer having the required index of refraction on a microembossed image to produce a transparent structure including a holographic image or diffraction grating. The term 'transparent' is used herein to mean that a material or structure transmits at least about 70%, preferably at least about 90%, of incident visible light. Preferably the HRI and LRI materials are formulated as inks that can be used in conventional printing processes. HRI and LRI coating formulations have a viscosity in the range of about 15 to about 50 centistokes, more preferably about 21 to about 27 centistokes. The percent solids in such formulations varies from material to material. Preferred coating weights are about 0.5 to about 2.0 grams/square meter, more preferably about 0.8 to about 1.2 grams/square meter.

Table 1 provides an exemplary list of presently preferred HRI materials (depending on the refractive index of the microembossed layer), but other similar products may be employed as well.

TABLE 1

| Material | Description | Refractive Index |
| --- | --- | --- |
| Bi-Flair 83 (EM Industries) | BiOCl | 2.15 |
| AMT-130S (Nissan Chemical) | $Sb_2O_5$ | 1.67 |
| HIT-30 (Nissan Chemical) | $TiO_2$—$ZrO_2$—$SnO_2$ | 1.85 |
| HIT-32 (Nissan Chemical) | $TiO_2$—$ZrO_2$—$SnO_2$ | 1.90 |
| Celnax (Nissan Chemical) | $ZnO_2Sb_2O_5$ | 1.70 |

In a first embodiment of the invention, a HRI or LRI material is directly applied to a microembossed image, i.e., a hologram or diffraction grating, forming a transparent structure through which the image can be viewed. The HRI/LRI material can be applied by any suitable process, e.g., flexography, rotogravure, gravure, offset, intaglio, litho or the like. Rotogravure is generally preferred.

The optical effects of the microembossed image in the transparent structure are visible due to the difference between the refractive index microembossed layer and the refractive index of the HRI or LRI layer. For a free-standing (uncoated) microembossed image, i.e., without an HRI or LRI layer, the difference between the refractive index of the HRI or LRI layer (e.g., 1.3–1.5) and air (1.0) is enough to allow light to be refracted so that a "rainbow" effect may be observed. If the free-standing hologram is further coated with a material having a similar refractive index, such as a typical adhesive coating, the image will be obscured. In order to retain the holographic effect, either a reflective material such as aluminum or a transparent substance with a refractive index which sufficiently differs from that of the microembossed layer will be required.

The HRI or LRI coating, when dry, should be of sufficient thickness to cover any functional portion of the microembossed coating completely and should provide whatever functionality is needed in the end product, e.g., flexibility, toughness, scratch resistance, adhesiveness, etc. Colloidal suspensions of metal oxides such as $Sb_2O_5$ or composites of metal oxides such as $TiO_2$—$ZrO_2$—$SnO_2$ are preferred for this purpose. These materials may be coated to a thickness of 0.3–3.0 microns, preferentially 0.5–1.0 microns, e.g., using a gravure cylinder.

Alternatively, the HRI or LRI material may be mixed with a resinous binder component such as an acrylic or rosin. One such example is commercially available BiOCl in an acrylic binder. This allows the HRI or LRI layer to exhibit additional functionality such as adhesive properties.

In another embodiment, the HRI or LRI coating may be applied selectively to portions of the microembossed coating. When an additional coating such as an adhesive layer is subsequently applied, the holographic image will be obscured in areas which are not coated with the HRI or LRI coating, leaving a selectively holographic article.

In another embodiment of the invention, a microembossed transfer structure such as a hot stamped foil or overlay is constructed with techniques well known in the art.

Typically, a carrier film such as a polyester, nylon, or polypropylene, is coated with a release coat. It is customary to use natural waxes, synthetic waxes, or combinations thereof as the release coating. The release coat may be aqueous or solvent-borne and applied, e.g., via a gravure process. Subsequently, an embossable coating such as an acrylic or acrylic/nitrocellulose blend is applied to the release coat. The embossable coating is microembossed under heat and pressure using techniques which are well known. For example, a holographic medium such as a metal or plastic shim may be used to press the image into the embossable coating e.g., in a roll-to-roll process. Such constructions are well known to those skilled in the art. The resulting free-standing hologram is then coated with a solution-borne HRI or LRI material in the form of a colloidal suspension or a dispersion in combination with a binder resin, preferentially via rotogravure coating.

The HRI or LRI coating protects the free-standing transparent hologram so that further coatings may be applied without obscuring the holographic image. In the case of a transfer product such as a hot stamping foil or security overlay, a clear, colorless adhesive coating is applied to the HRI or LRI coating. The adhesive layer is preferentially comprised of a blend of acrylic and rosin resins but may consist of any of the many materials known to those skilled in the art. The term microembossed image is used herein to describe the image itself which can be produced by known microembossing methods, but regardless of what technique is actually used.

FIG. 1 is a cross-sectional view of a transparent holographic hot stamping foil. The carrier film 1 is coated successively with a release layer 2 and a microembossable layer 3. The microembossable layer is microembossed with a relief pattern and is then solution (liquid) coated with a HRI or LRI layer 4. Finally, an adhesive layer 5 is applied. Layers 2, 3 and 5, may be applied via any suitable coating technique.

In another embodiment, the HRI coating, or if desired LRI coating, may be applied in a pattern such as stripes or a logo. When the adhesive coat is subsequently applied, the holographic image will be preserved only in those areas which were protected with the HRI or LRI material. Other regions will be rendered nonholographic.

Transparent holographic foils and overlays may be used for decorative or security applications. The coatings are hot stamped or otherwise transferred to a substrate under heat and pressure, leaving a distinctive mark which is difficult to counterfeit. An important advantage of the transparent holographic construction is that text or graphics below the hologram may be viewed through the layers. Good examples of this application include drivers licenses and identification cards.

In yet another embodiment of the invention, a holographic label material is prepared. A substrate film such as polyester, nylon, polypropylene, or PVC is coated with a microembossable material such as an acrylic which will adhere strongly to the film, and that layer is microembossed. Alternatively, the substrate film may be directly microembossed to form a free-standing holographic image. Alternatively, the substrate film may be coated with a material which will separate with a degree of difficulty to form a tamper evident label. Subsequently, the microembossed material is flood coated with a HRI or LRI material to enhance the holographic image. In a final step, an adhesive such as a hot melt adhesive or a pressure sensitive adhesive is applied to the HRI or LRI coating to form a label according to methods well known to those skilled in the art.

In another alternative embodiment, the HRI or LRI coating is applied to the microembossed surface selectively using known printing techniques. When the adhesive layer is subsequently applied the holographic image will be selectively obscured. Labels prepared in this fashion are used as security features where tamper evidence is desired or where product authentication is sought. The labels may serve a decorative function also. Transparent holographic labels may be applied over graphics or text that must be visible.

Figure 2:
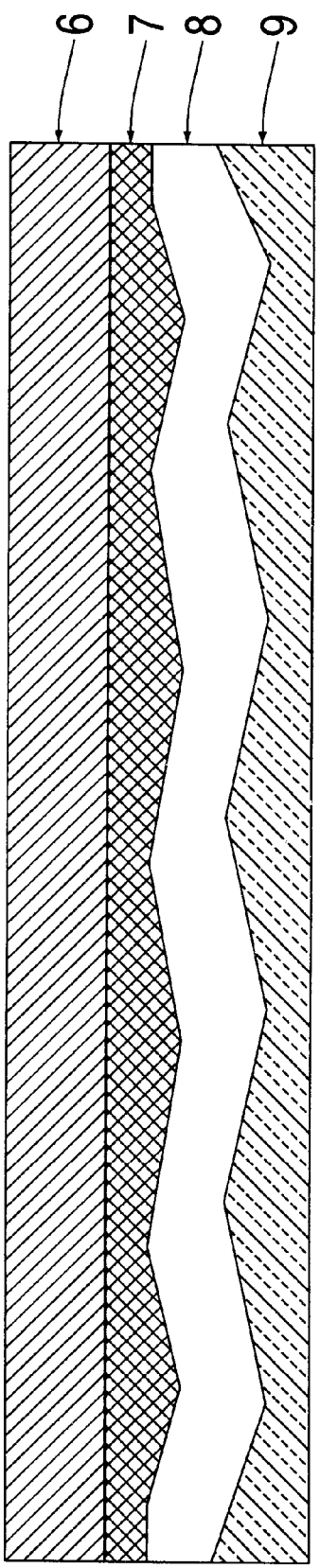
FIG. 2 is a cross-sectional diagram of a transparent holographic adhesive label prepared in accordance with the present invention.

FIG. 2 is a cross sectional diagram of a transparent holographic label. Carrier film 6 is successively coated with a microembossable layer 7 which is microembossed with a relief structure. The microembossed surface is solution (liquid) coated with an HRI or LRI layer 8 and finally with an adhesive layer 9. Layers 7 and 9 may be applied via any suitable solution coating technique. The adhesive layer may be any suitable material such as pressure sensitive adhesive or a hot melt adhesive suitable for preparing a label.

In another embodiment of the invention a holographic film is prepared. A film such as polyester, nylon, polypropylene, or PVC is either coated with a microembossable material such as an acrylic which will adhere strongly to the film and is subsequently microembossed, or the film may be directly microembossed to form a free-standing hologram. Subsequently, the microembossed material is solution (liquid) coated, preferably flood coated, with a HRI or LRI material to enhance visibility of the holographic image.

In an alternative embodiment, the HRI or LRI coating may be applied to the microembossed surface selectively using known printing techniques. When the adhesive layer is subsequently applied the holographic image will be selectively obscured. Films prepared in this fashion may be laminated to paper or board or may be used as a packaging over-wrap. Text, graphics, and even product can be readily viewed through the transparent structure, and the holographic imagery provides decorative and/or security features.

EXAMPLE

The following example further illustrates the invention.

A commercially available embossed hot stamping foil base film (Foilmark, Inc. HC9 base) consisting of 15 micron thick polyester film coated with a release coating and an embossable topcoat which was subsequently embossed was loaded onto the unwind stand of a homebuilt gravure coating machine. The coating pan was filled with a solution of BiFlair 83S (EM Industries) at 32.40% solids and a viscosity of 26 centistokes. The coating was applied to the embossed surface of the coating at a speed of 200 feet/minute and was dried at 200 degrees F. for eight seconds. The application cylinder was a laser engraved 200 line screen ceramic cylinder. In a separate process, a further clear, colorless adhesive coating suitable for graphic arts applications was applied.

While several embodiments of the invention are shown and described above, it is to be understood that the same are susceptible to numerous changes and modifications apparent to one skilled in the art and thus it is intended that all such changes and modifications be embraced by the appended claims.

What is claimed is:

1. A method for making a transparent holographic hot stamping coil including a microembossed image, which consists of the following steps in the following order:

providing a transparent carrier film layer; applying a release layer to the carrier film layer;

applying an embossable coating to the release layer;

microembossing an image on the embossable coating;

applying a liquid to the microembossed image to form a transparent refractive layer that enhances the visibility of at least a portion of the image; and applying an adhesive layer to the refractive layer.

2. The method of claim 1, wherein the microembossed image is a hologram or a diffraction grating.

3. The method of claim 2, wherein the refractive layer has a refractive index that differs from the transparent layer's refractive index by about 0.2 or more.

4. The method of claim 3, wherein the liquid is applied by a coating technique.

5. The method of claim 4, wherein the coating technique is a printing technique.

6. The method of claim 5, wherein the printing technique is selected from the group consisting of flexography, gravure, rotogravure, offset, intaglio, and litho.

7. The method of claim 5, wherein the printing technique is rotogravure.

8. The method of claim 6, wherein the liquid has a viscosity in the range of about 15 to about 50 centistokes.

9. The method of claim 6, wherein the liquid has a viscosity in the range of about 21 to about 27 centistokes.

10. The method of claim 8, wherein the liquid is coated at a weight of about 0.5 to about 2.0 grams/square meter.

11. The method of claim 9, wherein the liquid is coated at a weight of about 0.8 to about 1.2 grams/square meter.

12. The method of claim 8, wherein the refractive layer is formed from liquid including at least one material selected from the group consisting of HRI and LRI materials and a binder.

13. The method of claim 8, wherein the refractive layer is includes at least one compound selected from the group consisting of $BiOCl$, $Sb_2O_5$, $TiO_2$—$ZrO_2$—$SnO_2$ and $ZnO_2Sb_2O_5$.

14. The method of claim 8, wherein the liquid is in a form selected from the group consisting of dispersions, solutions, suspensions and emulsions.

15. The method of claim 8, wherein the refractive layer covers only a portion of the microembossed image.

16. The method of claim 12, wherein the binder is selected from the group consisting of rosin and acrylic polymers.

17. The method of claim 8, wherein the refractive layer has a thickness of about 0.3 to about 3.0 microns.

18. The method of claim 8, wherein the refractive layer has a thickness of about 0.5 to about 1.0 microns.

* * * * *